J. O. SWIGERT.
BEATER OR MIXER.
APPLICATION FILED AUG. 31, 1917.
1,292,141. Patented Jan. 21, 1919.
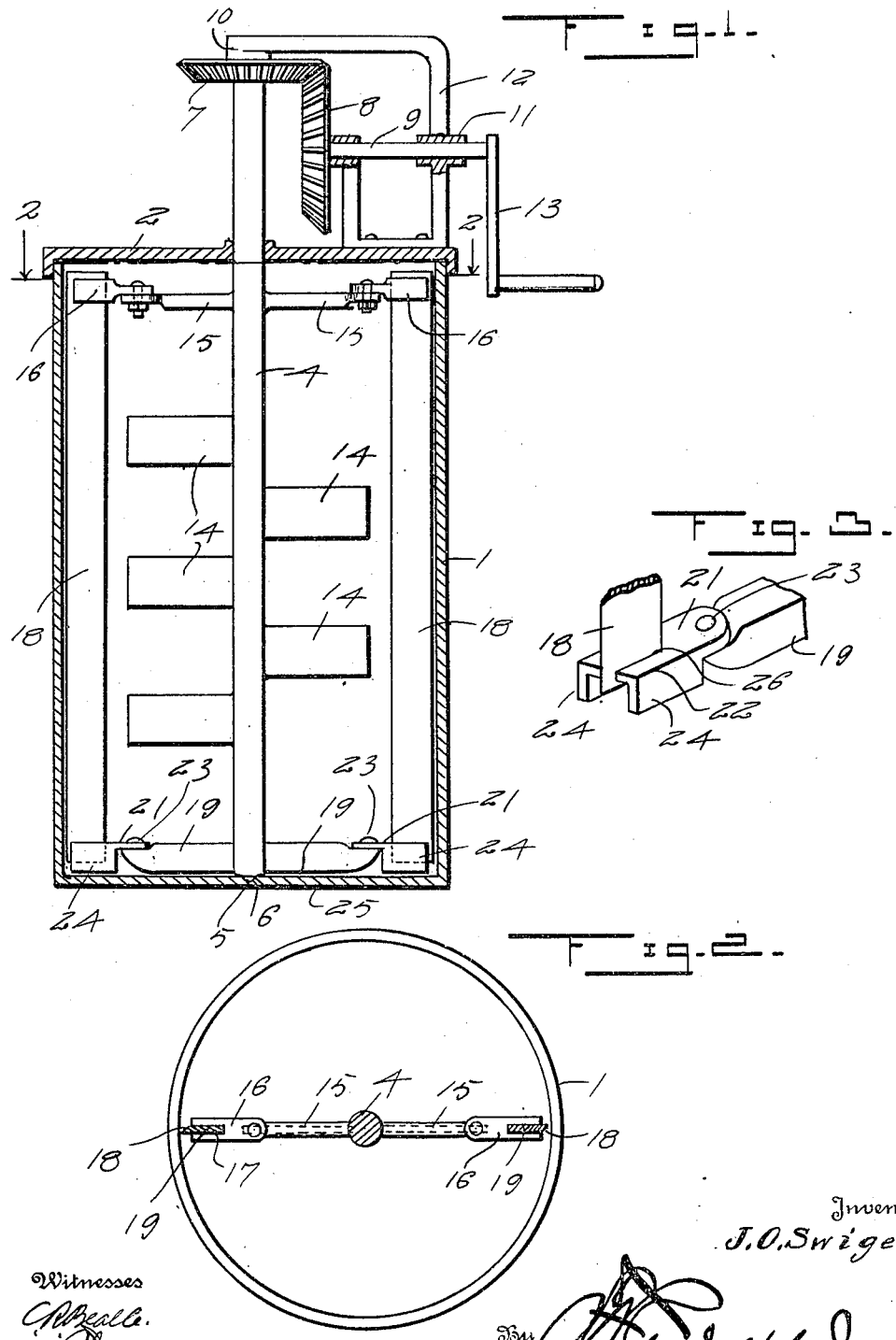

UNITED STATES PATENT OFFICE.

JOSEPH O. SWIGERT, OF INDIANAPOLIS, INDIANA, ASSIGNOR OF ONE-THIRD TO JOHN B. WIRT, OF INDIANAPOLIS, INDIANA.

BEATER OR MIXER.

1,292,141.  Specification of Letters Patent.  Patented Jan. 21, 1919.

Application filed August 31, 1917. Serial No. 189,187.

*To all whom it may concern:*

Be it known that I, JOSEPH O. SWIGERT, a citizen of the United States, residing at Indianapolis, in the county of Marion and State of Indiana, have invented certain new and useful Improvements in Beaters or Mixers; and I do hereby declare the following to be a full, clear, and exact description of the invention, such as will enable others skilled in the art to which it appertains to make and use the same.

This invention relates to a beater or mixer, which is particularly designed for beating or mashing potatoes or for mixing corn meal with the necessary ingredients for making corn bread or for mixing any desired material, and the primary object of the invention is to provide a mixer as specified which includes a receptacle having a removable cover, and a rotary dasher or mixer positioned centrally within the receptacle and comprising a vertical shaft having a plurality of paddles formed integrally therewith, and also a plurality of arms to the outer ends of which are pivotally connected coupling members, which coupling members carry blades that extend vertically along the inner walls of the receptacle for preventing the material being mixed within the receptacle from adhering to the sides of the same.

A further object of this invention is to provide arms at the lower end of the vertical shaft, the lower edges of which arms scrape the bottom of the receptacle, and further to provide couplings which are pivotally connected to the outer ends of the arms and have their edges downturned for forming scrapers to scrape the portion of the bottom of the receptacle over which they travel.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:

Figure 1 is a vertical section through the improved mixer,

Fig. 2 is a horizontal section on the line 2—2 of Fig. 1, and

Fig. 3 is a fragmentary perspective view of one of the lower arms showing the manner of connecting the vertical scraping blades thereto.

Referring more particularly to the drawings, 1 designates the receptacle of the mixer, which is cylindrical in shape and has a removable cover 2 mounted on its upper open end, through which the ingredients to be mixed are inserted.

The cover 2 has a bearing collar 3 carried by the center of the same through which the vertical rotary shaft 4 extends. The shaft 4 extends entirely through the length of the interior of the receptacle 1 and has a thrust bearing 5 formed upon its lower end which seats in a bearing recess 6. The upper end of the shaft 4 has a bevel gear 7 mounted thereon which meshes with a second bevel gear 8. The upper end of the shaft 4, and the shaft 9, upon which the bevel gear 8 is mounted are rotatably supported by suitable bearings 10 and 11 respectively, which are formed upon an arm 12. The arm 12 is carried by the cover 2 as clearly shown in Fig. 1 of the drawings. The shaft 9 has a crank handle 13 formed thereon for manually rotating the same.

A plurality of radially extending paddles 14 are formed integrally with the shaft 4 at spaced intervals and are disposed staggeredly with respect to each other. A pair of arms 15 are formed integrally with the shaft 4 adjacent to its upper end, or near the upper edge of the receptacle 1. The arms 15 have coupling members 16 pivotally connected thereto, which coupling members have their outer ends bifurcated as shown at 17 in which bifurcations are seated the upper ends of the vertical blades 18. The blades 18 extend through the depth of the receptacle 1 and engage the inner surface of the receptacle for preventing the material from adhering to the inner wall of the receptacle.

A pair of arms 19 are formed upon the lower end of the shaft 4, and the lower edges of these arms engage the inner surface of the bottom of the receptacle 1 forming scrapers for preventing the material from adhering to the bottom of the receptacle. The outer ends of the arms 19 are recessed as shown at 20, and tongues 21 which are formed upon coupling members 22 are seated in the recesses and pivotally connected to the outer ends of the arms 19 by pivot pins 23. The coupling members 22 are preferably constructed of sheet metal or the like and have their edges bent downwardly, to form downwardly extending portions 24, the lower edges of which scrape the inner surface of the bottom 25 of the receptacle 1 outwardly of the portion of the bottom scraped by the lower edges of the arms 19. The coupling members 22 are provided with recesses 26 formed therein in which the lower ends of the blades 18 are seated.

In reducing the invention to practice, certain minor features of construction, combination and arrangement of parts may necessitate alterations to which the patentee is entitled provided such alterations are comprehended within the scope of what is claimed.

What is claimed is:—

1. A mixer including a receptacle, a rotary shaft therein, arms extending from one end of the shaft and having scraping edges engageable with the adjacent end of the receptacle, coupling members connected to said arms and also including scraping edges co-acting with the first-named scraping edges to engage said end of the receptacle, and blades rotatable with said shaft and having their ends mounted in said coupling members.

2. A mixer including a receptacle, a rotary shaft therein, arms extending from one end of the shaft and having scraping edges engageable with the adjacent end of the receptacle, coupling members pivoted to the outer ends of said arms and also including scraping edges co-acting with the first-named scraping edges to engage said end of the receptacle, and blades rotatable with said shaft and having their ends mounted in said coupling members.

3. A mixer including a receptacle, a rotary shaft therein, arms extending from one end of the shaft and having scraping edges engageable with the adjacent end of the receptacle, coupling members connected to said arms and having downwardly extending portions the lower edges of which are provided with scraping edges co-acting with the first-named scraping edges, said coupling members also having recesses, and blades rotatable with said shaft and having their ends thereof mounted in the recesses in said coupling members.

In testimony whereof I affix my signature in presence of two witnesses.

JOSEPH O. SWIGERT

Witnesses:
JAMES R. BARNES,
CHAS. G. GROH.

Copies of this patent may be obtained for five cents each, by addressing the "Commissioner of Patents, Washington, D. C."